United States Patent
Sheblee et al.

(10) Patent No.: US 9,606,343 B2
(45) Date of Patent: Mar. 28, 2017

(54) ENHANCING SPATIAL RESOLUTION UTILIZING MULTIBEAM CONFOCAL SCANNING SYSTEMS

(71) Applicant: VisiTech International Ltd, Sunderland (GB)

(72) Inventors: Jafer Sheblee, Chester le Street (GB); Steven Coleman, Wallsend (GB)

(*) Notice: Subject to any disclaimer, the term of this patent is extended or adjusted under 35 U.S.C. 154(b) by 114 days.

(21) Appl. No.: 14/746,456

(22) Filed: Jun. 22, 2015

(65) Prior Publication Data

US 2015/0286041 A1 Oct. 8, 2015

Related U.S. Application Data

(63) Continuation-in-part of application No. 13/199,725, filed on Sep. 8, 2011, now abandoned.

(30) Foreign Application Priority Data

May 6, 2011 (GB) .................................. 1107556.1

(51) Int. Cl.
G02B 21/00 (2006.01)
G02B 21/36 (2006.01)
G02B 27/58 (2006.01)

(52) U.S. Cl.
CPC ....... G02B 21/0072 (2013.01); G02B 21/008 (2013.01); G02B 21/0044 (2013.01); G02B 21/0048 (2013.01); G02B 21/367 (2013.01); G02B 27/58 (2013.01)

(58) Field of Classification Search
CPC G02B 21/0044; G02B 21/008; G02B 21/367; G02B 27/141

USPC ........ 250/208.1, 234–236, 216, 201.3, 559.4
See application file for complete search history.

(56) References Cited

U.S. PATENT DOCUMENTS

| | | |
|---|---|---|
| 5,428,475 A | 6/1995 | Tanaami et al. |
| 5,579,157 A | 11/1996 | Tanaami et al. |
| 5,633,751 A | 5/1997 | Tanaami et al. |
| 5,717,519 A | 2/1998 | Sugiyama et al. |
| 5,847,867 A | 12/1998 | Sugiyama et al. |
| 6,248,995 B1 | 6/2001 | Tanaami et al. |
| 6,300,618 B1 | 10/2001 | Tanaami et al. |
| 6,815,035 B2 | 11/2004 | Bennett et al. |
| 7,283,306 B2 | 10/2007 | Mikuriya et al. |

(Continued)

OTHER PUBLICATIONS

European Search Report dated Jul. 26, 2012 in Application No. EP11007031, 6 pages.

(Continued)

*Primary Examiner* — Que T Le

(57) ABSTRACT

A method for utilizing a multi-beam confocal scanning system to generate an image of a sample, the image having an improved resolution, is provided. An array of beams may be positioned at a first location on the sample. A first plurality of images may be captured, where each of the first plurality of images is associated with a beam of the array of beams at the first location. The array of beams may be adjusted by a specific distance to a second location on the sample, the specific distance being smaller than an optical resolution limit of the multi-beam confocal scanning system. A second plurality of images may be captured, where each of the second plurality of images is associated with a beam of the array of beams at the second location.

20 Claims, 12 Drawing Sheets

(56) References Cited

U.S. PATENT DOCUMENTS

| 7,706,584 B2 | 4/2010 | Saggau et al. |
| 2008/0037114 A1 | 2/2008 | Sheblee |
| 2011/0025837 A1* | 2/2011 | Vossen ................ G02B 21/002 |
| | | 348/79 |

OTHER PUBLICATIONS

Claus B. Muller et al., Imaging Scanning Microscopy, Physical Review Letters, vol. 104, No. 19, dated May 1, 2010, 4 pages.
Hans Blom et al., Blurry Vision Belongs to History, Physics, vol. 3, dated May 1, 2010, 2 pages.
Non-Final Office Action dated Aug. 5, 2013 in U.S. Appl. No. 13/199,725, 10 pages.
Final Office Action dated Feb. 10, 2014 in U.S. Appl. No. 13/199,725, 7 pages.
Non-Final Office Action dated Jan. 23, 2015 in U.S. Appl. No. 13/199,725, 8 pages.

* cited by examiner

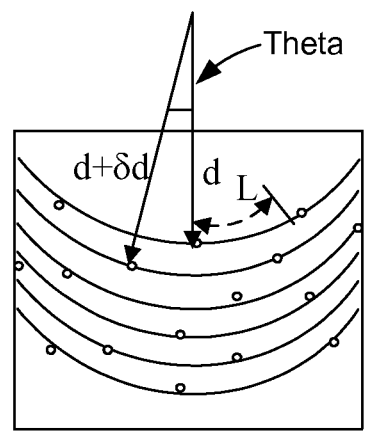
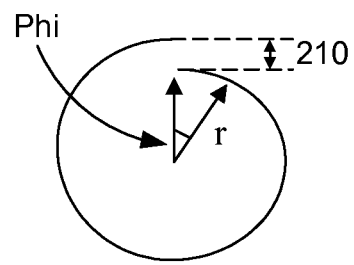
FIG. 2A    FIG. 2B
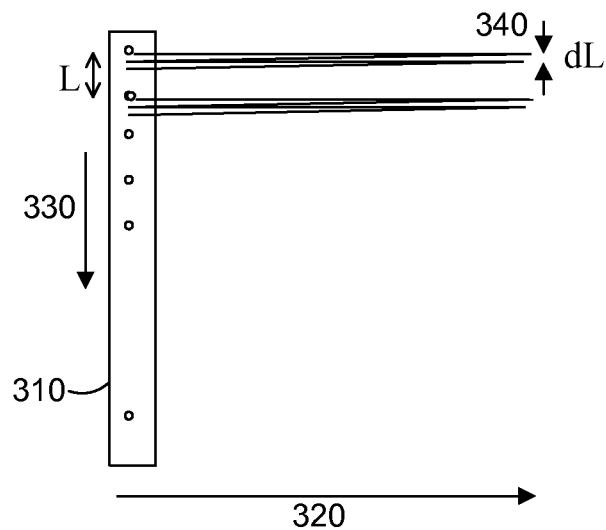
FIG. 3A

ENHANCING SPATIAL RESOLUTION UTILIZING MULTIBEAM CONFOCAL SCANNING SYSTEMS

CROSS-REFERENCE TO RELATED APPLICATIONS

This patent application is a continuation-in-part of pending U.S. application Ser. No. 13/199,725, filed on Sep. 8, 2011, entitled "Enhancing Spatial Resolution Utilizing Multibeam Confocal Scanning Systems," which claims priority to United Kingdom Patent Application No. GB 1107556.1, filed on May 6, 2011. The entirety of each of U.S. application Ser. No. 13/199,725 and United Kingdom Patent Application No. GB 1107556.1 is hereby incorporated by reference.

TECHNICAL FIELD

An embodiment hereof relates to improving the spatial resolution of images captured using multi-beam confocal imaging systems.

BRIEF DESCRIPTION OF THE DRAWINGS

FIG. 2A illustrates exemplary spiral parameters for a spinning disc confocal configuration, in accordance with an embodiment hereof;

FIG. 2B illustrates exemplary spiral arrangements, in accordance with an embodiment hereof;

FIG. 3A illustrates 1-D swept field parameters, in accordance with an embodiment hereof;

DETAILED DESCRIPTION

Figure 1A:
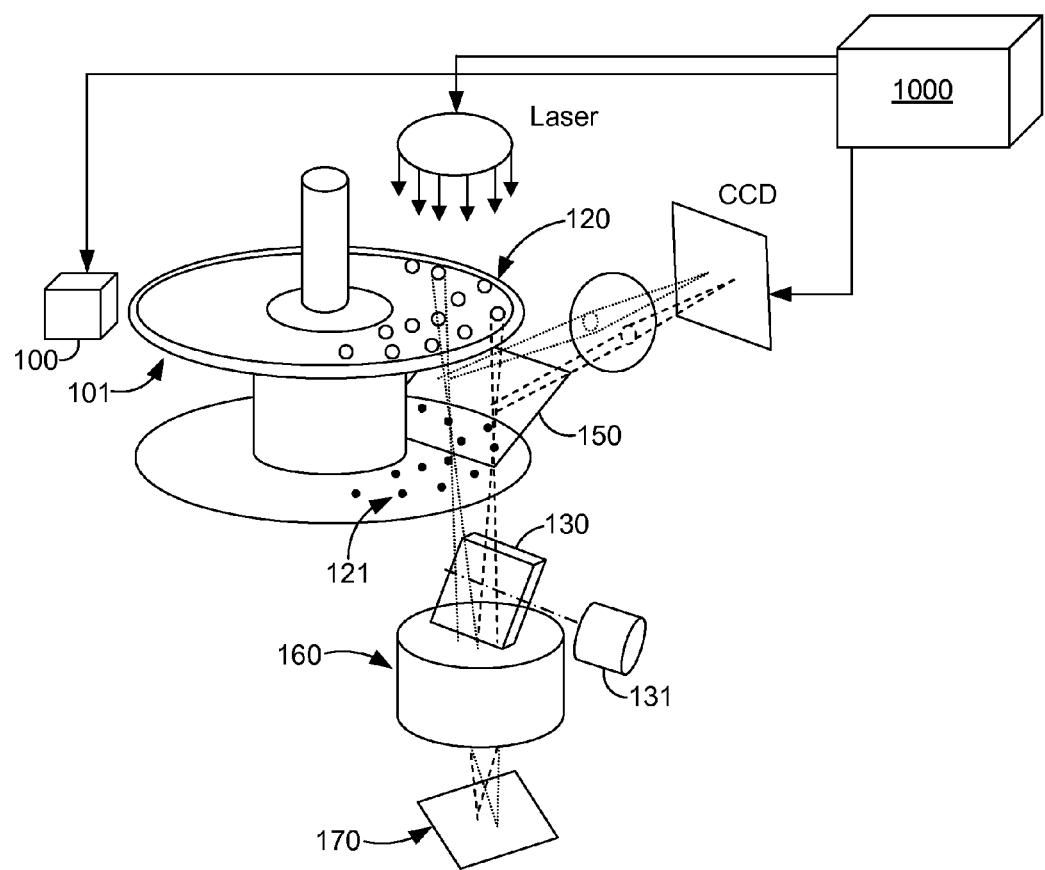
FIG. 1A illustrates an exemplary Nipkow disc confocal configuration, which includes an encoder arrangement on the rotating disc and a tilting window, among other things, in accordance with an embodiment hereof.

The subject matter hereof is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Exemplary embodiments hereof relate to improving the spatial resolution of images captured using multi-beam confocal scanning systems. In some instances, this improvement is provided by configuring a multi-beam confocal scanner to capture data in sub optical resolution scan increments, and that data is used to produce a final image exhibiting enhanced spatial resolution.

At a high level, in accordance with an embodiment hereof, a multi-beam confocal scanner may be configured to provide an array of illumination spots that sequentially step through a scan pattern over a sample, rather than scan the sample continuously, where the sequential steps correspond to sub optical resolution scan increments. An image of the sample may be captured at each step position, and each of the images so captured may be divided into an array of sub images, or regions of interest ("ROIs"), where each sub image, or ROI, is centered on a position corresponding to one of the illumination spots. This image data may then be collected and processed according to certain methods discussed below.

For example, in an embodiment, multiple ROIs are obtained from a series of images, where the series of images correspond to the series of step positions. Taken together, these ROIs form a complete scan of the sample. Pixel intensity data from each of those ROIs may be processed to create an intermediate image having an improved resolution. In an embodiment, this intermediate image is Fourier transformed, filtered with a weighting function based on an improved point spread function ("PSF"), and reverse Fourier transformed to create a final image containing further resolution enhancement.

The ability to collect pixel intensity data in parallel from multiple ROIs when using multi-beam scanners significantly improves the speed of image, or data, capture. The ability of modern computer systems with parallel operation of multiple and multi-core CPUs and multi-threaded software provides suitable environments for efficient use of the increased data capture rates and offers the potential for real-time imaging with enhanced spatial resolution.

Accordingly, an aspect hereof relates to a method for utilizing a multi-beam confocal scanning system to generate an image of a sample, where the image has an improved resolution. The method includes scanning a sample utilizing an array of beams of the multi-beam confocal scanning system. The scanning comprises the array of beams appearing stationary at multiple locations on the sample. The method further includes capturing a plurality of secondary images at each location of the multiple locations on the sample. Additionally, the method may include dividing each of the plurality of secondary images into an array of pixel intensities. The method may further include collecting the array of pixel intensities to be processed to create the image having improved resolution.

Another aspect hereof relates to a method for utilizing a multi-beam confocal scanning system to generate an image of a sample, where the image has an improved resolution. The method includes positioning an array of beams at a first location on the sample and capturing a first plurality of images, where each of the first plurality of images is associated with a beam of the array of beams at the first location. The method further includes adjusting the array of beams by a specific distance, where the specific distance is smaller than an optical resolution limit of the multi-beam confocal scanning system. Additionally, the method may include capturing a second plurality of images, where each of the second plurality of images is associated with a beam of the array of beams at the second location.

In yet another aspect hereof, a method is provided for generating an image having an improved resolution utilizing a multi-beam confocal scanning system comprising one or more rotating discs containing a spatial filer and an array of confocal apertures. The method includes positioning an array of beams at a first location on a sample and capturing a first plurality of images, where each of the first plurality of images is associated with a beam of the array of beams at the first location, and where each of the first plurality of images is centered on a first beam location associated with the respective beam of the array of beams. The method further includes adjusting the array of beams by a specific distance to a second location on the sample, where the specific distance is smaller than the optical resolution limit of the multi-beam confocal scanning system. Additionally, the method includes capturing a second plurality of images, where each of the second plurality of images is associated with a beam of the array of beams at the second location, and where each of the second plurality of images is centered on the second beam location associated with the respective beam of the array of beams.

Having briefly described an overview of embodiments hereof, additional exemplary features are described below.

Single-Beam Confocal Scanning Systems

Attempts at improving spatial image resolution beyond the Abbe resolution limit in wide field and confocal imaging systems have used structured illumination methods combined with manipulation of the Fourier representation of those images (see, e.g., Müller et al., Image Scanning Microscopy, 104 Physical Review Letters 198101 (May 2010)). These attempts have been targeted at traditional single-beam confocal scanning systems and have not been applied to multi-beam confocal scanning systems, because the latter systems do not inherently include certain elements, or the precision of step-by-step scanning or synchronization between elements, that are used to obtain the data utilized for calculations that result in the improved spatial image resolution.

For example, in Müller et al., a single point confocal scanning system is made to scan a focused laser illumination beam step by step over a sample. An image of an ROI is captured at each stationary beam scan position, $r_{jk}$. Pixel intensity values are obtained for each scan position, $r_{jk}$ and each pixel position, $s_{pq}$. This results in an array of pixel intensities, $I(r_{jk}, s_{pq})$. The distance between spatially adjacent scan positions on each coordinate axis is substantially less than the native optical resolution of the confocal system and typically a sub-multiple of the pixel dimensions of the detector. The data from the multiple ROIs are processed to produce an effective image, $I_{eff}(r_{jk})$:

$$I_{eff}(r_{jk}) = \sum_{p,q} I\left(r_{jk} - \frac{s_{pq}}{2}, s_{pq}\right).$$

The summation is taken over all pixels (p, q) of the ROI. The effective image $I_{eff}(r_{jk})$ is further processed by Fourier transformation, filtered with a weighting function equivalent to a PSF, and then reverse Fourier transformed into a spatial equivalent to produce a final image which exhibits enhanced spatial resolution. Full details of this data processing are given in Müller et al.

Multi-Beam Confocal Scanning Systems

There is a class of confocal imaging systems which use multi-beam scanning techniques to increase the speed of image capture over the traditional single beam scanners. A multi-beam scanner can be described as a confocal scanning system in which a confocal image is generated by scanning a sample with multiple illuminating light beams. The multiple illuminating light beams are created by a spatial filter located in an illumination light path to a sample focal plane. Reflected or fluorescent light returned from the sample is filtered by a matching spatial filter to form a confocal image that is recorded by a two-dimensional detector, such as a CCD camera. Such systems use multiple parallel beams that scan the sample simultaneously. Multi-beam scanners come in a variety of forms, including, for example, those based on Nipkow spinning discs (see, e.g., U.S. Pat. No. 5,428,475), 1-D array scanners (sometimes called "swept field scanners") (see, e.g., U.S. Pat. No. 6,856,457), and 2-D array scanners (see, e.g., WO2003/075070). An overview of each of these forms is provided below.

Nipkow disc based systems may use a single disc, which spins on its central axis. An array of apertures may be included in a conjugate image plane such that the illumination source is divided into multiple scanning beams. The return fluorescent or reflected light may pass through the same apertures, or an identical set of apertures, as is the case in tandem scanning confocal systems (see, e.g., U.S. Pat. No. 4,802,748), to provide a confocal image. An enhancement of the basic Nipkow disc arrangement, as patented by Yokogawa Electric Corporation of Japan, adds a second disc to the first disc, where the second disc contains an array of microlenses. The discs are positioned such that each aperture has an associated microlens. The second disc is inserted between the first disc and the light source, such that each of the microlenses collects the illumination light from a larger area and focuses it into its associated aperture, thus improving the efficiency of the illumination path. A dichromatic mirror, or beam splitter, placed between the two discs separates the emission, fluorescent or reflected, light from the illumination light and reflects it out from between the two discs.

Swept field scanners use a one-dimensional array of illumination apertures, with or without an associated microlens array, which is scanned rapidly back and forth across a sample while a piezo transducer oscillates the scanning lines of the one-dimensional array along the axis of the array with an amplitude equal to the separation of the apertures in the 1-D array. The period of the piezo oscillation is typically half that of the framing rate of the image capture device, such that each half period scans the whole sample field of view.

2-D array scanners use a single oscillating galvanometer mirror to scan a 2-D array of illumination apertures, with or without an associated microlens array, back and forth across the sample. Each sweep completes a full scan of the sample.

The fluorescent light returned in both the swept field and 2-D array scanners is de-scanned by the scanning mirror, separated from the illumination light by a suitable dichroic mirror, and focused on to an array of imaging apertures matching the pattern positions of the array of illumination apertures in a conjugate focal plane. As mentioned, these systems may also make use of microlens arrays positioned in the illumination path such that the focus plane of the points of light so generated are focused as diffraction limited spots in the conjugate sample plane with or without passing through apertures in the illumination path.

Multi-beam scanning systems offer several useful advantages over single spot scanners. For example, multi-beam scanning systems provide faster scanning of the sample area, thereby enabling higher image capture rates to be achieved. Multi-beam scanning systems further provide for reduced photo-bleaching of the sample material with consequent reduction in phototoxic effects, especially when applied to the imaging of living cells in life science research. Consequently, improved spatial image resolution in these multi-beam scanning systems is highly desirable. Accordingly, exemplary embodiments hereof provide for adapting multi-dimensional confocal scanners to meet certain scanning requirements, as well as collecting and processing data into an appropriate format for two-dimensional image resolution enhancement. In an embodiment, the spatial resolution of images captured using multi-beam confocal scanning systems is improved by developing mechanisms included in a variety of multi-beam confocal scanner formats, where such mechanisms enable the capture of data that may be used in certain calculations that are performed to produce a final image exhibiting enhanced spatial resolution.

Configuring Multi-Beam Confocal Scanning Systems to Provide Images Having Enhanced Spatial Resolution Each of the beams in a multi-beam scanning system can be considered as an individual single beam scanner, provided that there is sufficient spatial separation between any pair of adjacent beams and the beams are focused into diffraction limited spots in the sample focal plane. These conditions are met for successful normal operation of such confocal systems and therefore can be assumed to exist in all practical multi-beam confocal scanning systems.

Each beam, or focused scanning spot of illumination, forms a special case of a structured illumination in which all Fourier components supported by the imaging optics are present (see Müller et al.). In normal operation, the scanning of these multiple beams or spots is continuous and the fluorescent, or reflected, light returned from the illuminated spots in the sample focus plane is focused on to a set of confocal apertures arranged such that every illumination spot has its own confocal aperture in a conjugate focal plane and the light which passes through the confocal apertures forms a confocal image in yet another conjugate focal plane. Typically, a two-dimensional detector, for example, a CCD camera, is placed in this focal plane (or in an optically relayed duplicate of it) to record the confocal image. Such confocal images are substantially limited in resolution by the Abbe resolution limit.

As mentioned, Müller et al. describes improving resolution beyond the Abbe resolution limit for single-beam confocal scanning systems. In order to do so, Müller et al. requires that a sample be scanned point by point, in increments smaller than the optical resolution limit of the optical system in two orthogonal directions in the sample focal plane of the confocal scanning microscope system. This requirement is not met by current multi-beam confocal scanning microscope systems. An exemplary embodiment hereof provides for configuring the various forms of multi-beam confocal scanning systems to achieve this requirement. Image data from multi-beam confocal scanning systems may thereby be collected and processed according to the methods described by Müller et al. in order to provide an image having enhanced spatial resolution. As used herein, "enhanced" spatial resolution refers to a resolution that is superior to the resolution of images provided by traditional multi-beam confocal scanning systems. For example, "enhanced" spatial resolution may refer to resolution that surpasses the Abbe resolution limit.

Accordingly, a high-level overview of exemplary means for configuring various forms of multi-beam confocal scanning systems to achieve sub optical increments is provided below. Then, a more detailed discussion of exemplary configurations is provided with respect to the figures.

Additional means may be implemented in order for 1-D or swept field confocal scanners to produce the required positional accuracy of the scanning mechanisms on both axes and to obtain the level of synchronization required between the scanning mechanisms and the image capture by the 2-D detector.

Additional means may also be implemented in order for Nipkow disc and 2-D array confocal scanners to move the scan orthogonal to their basic scanning direction in order to generate the additional data used in the calculations to create the improved resolution images. Such additional means can take various forms that deflect the scan in sub optical resolution dimensions with a total range of movement of the same order of magnitude as the native optical resolution of the target system.

The inclusion of devices to move both the microlens and pinhole arrays by equivalent amounts provides one method for implementing step-by-step scanning in increments smaller than the optical resolution limit of the optical system, which suits both the 1-D and 2-D array scanners. For example, a sub optical resolution increment on one or more axes may be produced by moving spatial filters along their respective axes with precise and accurate control of one or more displacement mechanisms. Such displacement mechanisms may include a piezo displacement device, a linear motor, a stepper motor, and a rotational motor for each spatial filter. The precise and accurate control of the displacement of the spatial filters may be provided by an electronic and/or computer control system, which will be discussed in greater detail below. Such control system may control the displacement mechanisms with precision and accuracy in order to provide the desired displacement of the spatial filters.

In a Nipkow disc scanner, the sub optical resolution scan increment may be achieved in the radial direction in a number of ways. For example, moving the scan of a Nipkow disc scanner in a radial direction across the sample field of view can be achieved by moving the center of rotation of the rotating disc(s) subassembly using displacement devices such as a piezo displacement device, a linear motor, or a rotational motor. Such displacement may be controlled by an electronic and/or computer control system. Additionally or alternatively, the scanning beams may be deflected, which can be achieved by inserting an optical window into the optical path between the confocal scanner and the microscope and tilting the window such that the scanning beams are deflected by refraction at the air/window and window/air interfaces by an amount determined by the angle of tilt and the thickness of the window. Yet another solution is the insertion and/or removal of a tilted, or tilting, window in the optical path to provide the necessary displacements orthogonal to the scan direction. Due to the reciprocal nature of the optical path, the fluorescent, or reflected, light returned from the sample on the microscope is deflected by an identical amount and hence no change in position of the microlens or pinhole arrays relative to the optical path is required, providing that compensation means are included for chromatic aberrations. The tilt angle may be controlled by the electronic and/or computer control system. Additionally or alternatively, a scanning mirror, such as a galvanometer driven mirror, carried by a drive mechanism may be used. The drive mechanism may be controlled by the electronic and/or computer control system.

1-D and 2-D array scanners may also use the technique of including a tilting optical window in the optical path between the confocal scanner and the microscope to shift the scanning beams.

Another solution involves arranging the array of points in the spinning disc and in the 2-D array scanner such that subsets of scanned points within the scan pattern are displaced by sub native optical resolution distances orthogonal to the scanning direction. The scan positions of the relative subsets of points are identified so that the appropriate ROI images can be used in the subsequent calculations. In this case, no additional displacement mechanism is needed. For example, no additional optics in the beam path need be included. This solution may be computationally efficient when the sub-optical resolution scanning increment is arranged to match a sub-multiple of the detector pixel size.

In certain embodiments including the Nipkow disc type of confocal scanner, the rotational position of the discs must be known to a sufficiently precise degree such that the relative image points required by the prior art calculations can be identified with sufficient accuracy. The angular position can be identified by techniques such as adding an encoding mechanism to the rotation of the discs. This can be, for example, a separate encoding module attached to the shaft or its motor drive, or an encoding pattern (e.g., optical, mechanical, magnetic) placed directly on one or both discs, and combined with a suitable encoder detection device.

In the 2-D array scanner, additional positional accuracy can be obtained by implementing such methods as closed loop control techniques to the drive of the scanning mirror. It is also necessary to ensure that the drive signal to the scanning mirror has the necessary resolution and accuracy to enable sufficiently small incremental scanning steps.

Using the above techniques the required image data can be collected by methods such as stepping the scan, position by position, over the sample area and capturing an image at each step. Additionally or alternatively, images may be collected while scanning "on the fly" by strobing the illumination and/or gating the detector at each required scan position.

The techniques mentioned above for achieving sub optical resolution scan increments, as well as others, are discussed in detail below with respect to the figures.

Figure 1B:
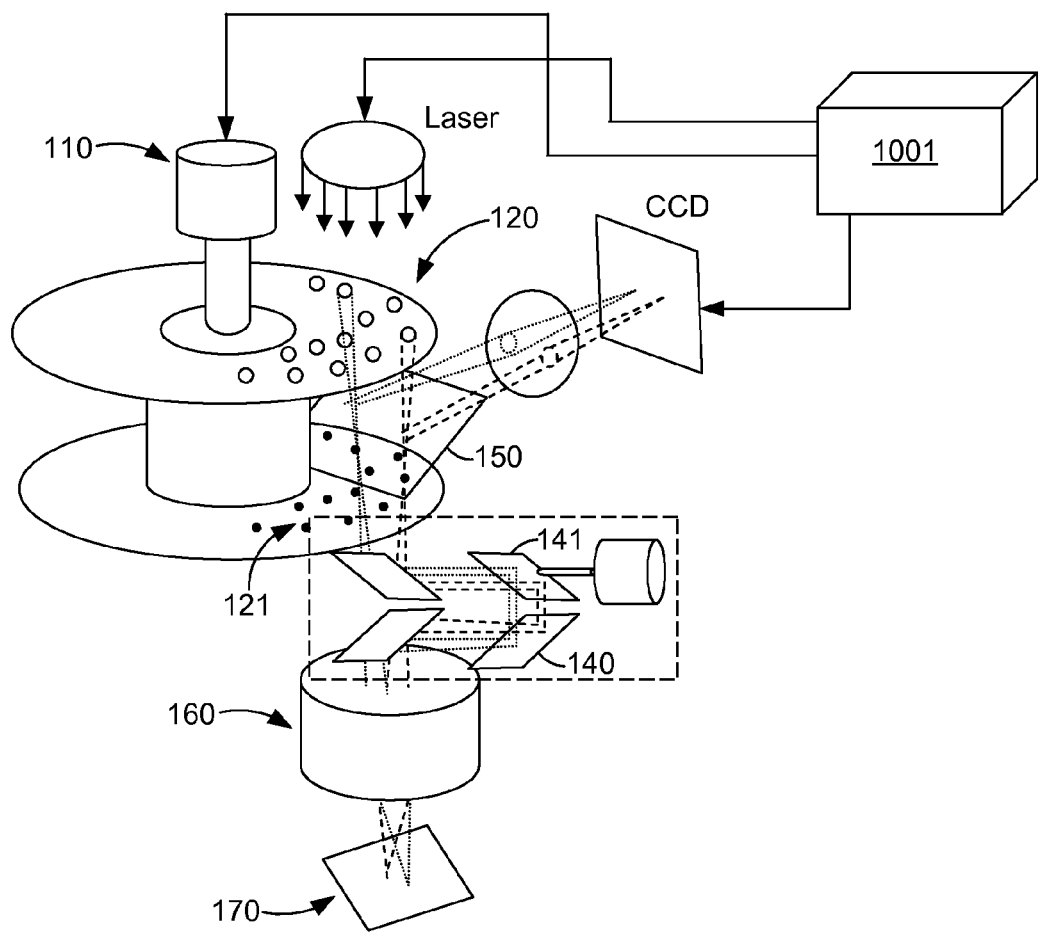
FIG. 1B illustrates an exemplary Nipkow disc confocal configuration, which includes an encoder on a rotating shaft and a galvanometer, among other things, in accordance with an embodiment hereof.

A typical Nipkow disc configuration is depicted in FIGS. 1A-1B. As shown, an expanded laser beam illuminates the field of view of the sample 170 after passing through a microlens array disc 120, a dichroic mirror 150 mounted between the microlens array disc 120 and a pinhole array disc 121, and the microscope optics 160. The matching patterns of microlenses on disc 120 and pinholes on disc 121 are constructed as a number of interleaved spiral patterns, as shown in FIG. 2B. The separation distance 210 between the start and end of one spiral is filled with N other identical spirals. Therefore in one rotation of the discs, the image is scanned N times. The microlenses and pinholes are typically arranged on the spirals such that the separation distance between them along the spiral is the same as the separation distance between spirals to maintain a uniform area density of microlenses and pinholes. The positions of the microlenses and pinholes on each spiral can be described by the polar coordinates (r, phi), as shown in FIG. 2B.

To achieve sub native optical resolution incrementing of the microlenses and pinholes in the rotational direction, the rotation angle theta, shown in FIG. 2A, may be monitored and used to determine when an image should be captured. For example, the rotation angle theta may be monitored to ensure that the distance between a first scan position corresponding to a first angle of rotation and the distance between a second scan position corresponding to a second angle of rotation is smaller than the optical resolution limit. Thus, in this example, the rotational position of the discs must be known to a sufficiently precise degree. This can be accomplished by techniques such as adding an encoding mechanism to the rotation of the discs. This can be a separate encoding module attached to the shaft or its motor drive, or an encoding pattern (e.g., optical, mechanical, magnetic) placed directly on one or both discs, and combined with a suitable encoder detection device.

FIG. 1A shows an encoder track 101, which may be magnetic or optical, and may be read by a suitable detector 100. FIG. 1B shows an encoder 110 mounted on the drive shaft or motor driving the discs. Such encoder configurations enable the rotation angle, theta, to be determined. Based on the rotation angle, an electronic and/or computer control system (such as the electronic and/or computer control systems 1000, 1001, and 1002, discussed below) may control the capture of images by a two-dimensional detector, such as a CCD camera, in order to capture images at the desired angular position.

Sub native optical resolution spacing between the scanned tracks of the microlenses and pinholes can be obtained by using techniques such as that depicted in FIG. 1A, where a thick optical window 130 is inserted into the optical path between the confocal head and the microscope and tilts about an axis perpendicular to the radius of the disc at the center of the field of view. The optical window can be tilted by devices such as a precision stepper or piezo motor 131, thus shifting the path of the spirals by sub native optical resolution spacing. Another method is to insert a galvanometer mirror into the beams between the confocal scanner and the microscope. Other positions of the galvo are possible, provided that the optical path is suitably modified. One such implementation is depicted in FIG. 1B, which shows the beam path extended by an array of mirrors 140, which includes a galvanometer mirror 141. An electronic and/or computer control system (such as the electronic and/or computer control systems 1000, 1001, and 1002, discussed below) may control the drive mechanism for the optical window and/or the drive mechanism for the scanning mirror. For example, the electronic and/or computer control system may control the tilt angle of the tilted optical window.

Yet another method for obtaining sub native optical resolution spacing in a Nipkow disc configuration is to make the spiral patterns identical, but shifted in phase such that the tracks made by the microlenses and pinholes in one spiral do not duplicate the tracks made by the microlenses and pinholes in any other spiral. This introduces N−1 additional tracks with the same spiral separation, which is sufficient to introduce sub native optical resolution δd, between adjacent tracks, where δd, is equal to original track spacing L divided by N tracks. Thus, in a full revolution of the discs, the scan lines generated by the pinholes and/or microlenses are separated by sub optical resolution increments along the radial axis d of the scan. In practical spinning disc systems, the number of spirals is typically 12, shifting the phase for each one would provide spacing of L/12. However, it would also be practical to have 2 repeats of 6 phase-shifted spirals, or 3 repeats of 4 phase-shifted spirals, etc., thus reducing the rate at which the disc needs to spin if the resulting separation of the tracks is still sub native optical resolution.

FIG. 1A illustrates, in part, an electronic and/or computer control system 1000, that may be used to synchronize and control components of a multi-beam confocal scanning system and certain events, as described in aspects hereof. As discussed, the electronic and/or computer control system 1000 may control, at least, a multi-beam laser illumination, a charge-coupled device (CCD) camera read out, suitable encoder detector 100, and/or precision stepper or piezo motor 131. FIG. 1B also illustrates, in part, an electronic and/or computer control system 1001, that may be used to synchronize and control components of a multi-beam confocal scanning system and certain events, as described in aspects hereof. The electronic and/or computer control system 1001 may control, at least, the multi-beam laser illumination, a CCD camera read out, high resolution encoder 110, and/or galvanometer 141. In some aspects, the electronic and/or computer control system 1000 is similar to the electronic and/or computer control system 1001. In other aspects, the electronic and/or computer control system 1000 is different from the electronic and/or computer control system 1001. In an embodiment, the electronic and/or computer control systems 1000 and 1001 resemble the computing device 1100, which will be discussed below with respect to FIG. 11.

Figure 3B:
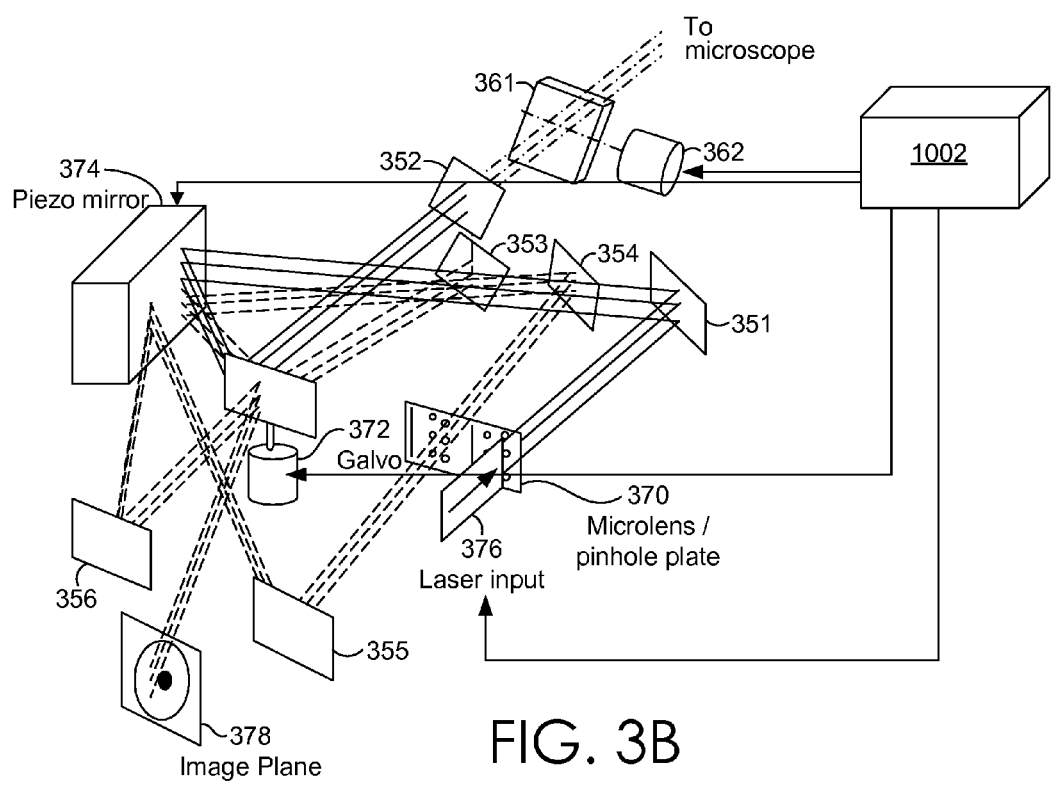
FIG. 3B illustrates an exemplary configuration for a 1-D confocal scanner, which includes a tilting window, among other things, in accordance with an embodiment hereof.

For a 1-D array scanning confocal configuration, an exemplary scan configuration is illustrated in FIG. 3A (only partial scans are shown for clarity). The spatial filter array 310 (represented by the microlens/pinhole plate 370 in FIG. 3B) is rapidly scanned back and forth across the sample in direction 320 (for example by a galvo, such as the galvo 372 of FIG. 3B) producing scan lines 340 separated by distance L equal to the aperture or microlens spacing in the spatial filter. The scanning of array 310 is also combined with an oscillation along its axis in direction 330 (for example by a piezo controlled mirror, such as the piezo controlled mirror 374 of FIG. 3B) by an amount L–dL, which is just less than the aperture separation. Accordingly the field of view is fully scanned in one capture interval of the image detection device. The distance dL and the separation between the oscillations can be identical to the sub native optical resolution of the system and conveniently set to be an integral sub-multiple of the microlens and pinhole spacing L. Scanning of the 1-D arrays in sub native optical resolution increments may be made in a variety of ways, such as reflecting the arrays off two orthogonal galvanometer mirrors, by reflecting the arrays off piezo controlled mirrors, by physical displacement of the arrays in the confocal head, by adjustment, via a motor 362, of a tilted window 361 in the optical path between the confocal head and a microscope, as shown in FIG. 3B, or combinations of these methods.

Additionally or alternatively, as shown in the exemplary embodiment depicted in FIG. 3B, the illumination light path is from the laser input 376 via mirror 351, piezo mirror 374, galvo mirror 372, dichroic 352, and optional tilting window 361, to the microscope. The fluorescent or reflected light from the sample is reflected at the beam splitter or dichroic mirror 352 to the mirror 353, de-scanned by the galvo mirror 372 and piezo mirror 374, received at the mirror 354, passed through the pinholes in the microlens/pinhole plate 370 and on to mirror 355, rescanned by the piezo mirror 374 and the galvo mirror 372 via mirror 356, to ultimately form an image of the sample at the image plane 378.

In FIG. 3B, an electronic and/or computer control system 1002, which may be similar to or different from the electronic and/or computer control systems 1000 and 1001, is used to synchronize and control components of a multi-beam confocal scanning system and certain events, as described in aspects hereof. The electronic and/or computer control system 1002 may control, at least, a laser illumination, galvo scanner, piezo mirror, and/or motorized tilted window 361. For example, because the system 1002 may control various drive mechanisms associated with the components discussed above, the system 1002 may control the tilt angle of a tilted window in order to provide sub optical resolution scan increments. In an embodiment, the electronic and/or computer control system 1002 resembles the computing device 1100, which will be discussed below with respect to FIG. 11.

Figure 5A:
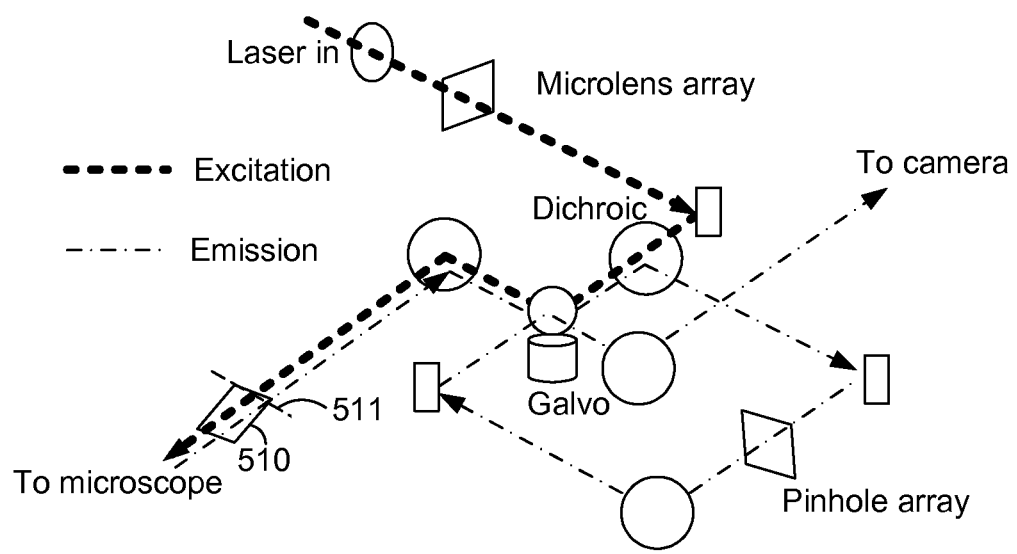
FIG. 5A illustrates a tilted mirror in an exemplary 2-D array confocal configuration, in accordance with an embodiment hereof.
Figure 5B:
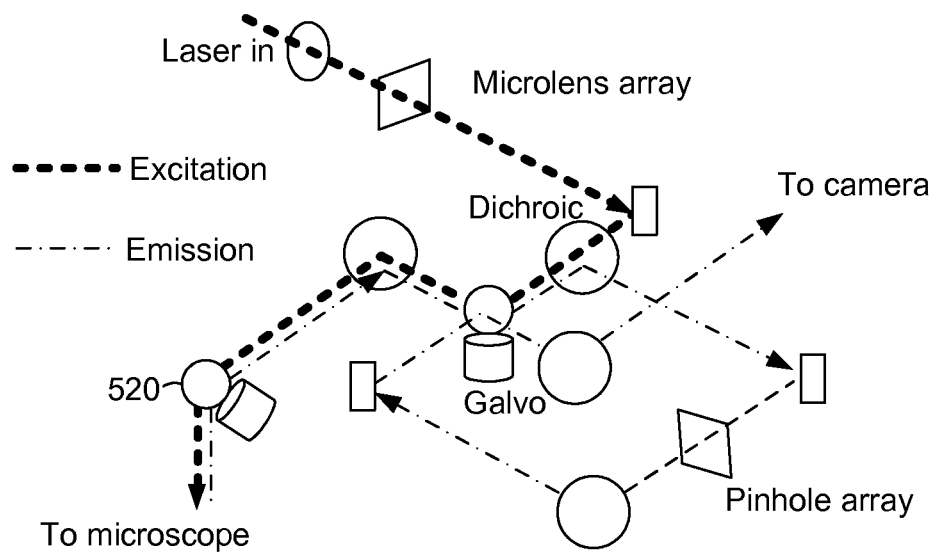
FIG. 5B illustrates an additional galvanometer in an exemplary 2-D array confocal configuration, in accordance with an embodiment hereof.

In a 2-D array scanning confocal system, the sub native optical resolution increments along the normal scanning direction can be set by precise control of the image scanning galvanometer. If only a single pattern of microlenses and pinholes is used for scanning, then an additional mechanism may be implemented to shift the scan in sub native optical resolution steps in the direction perpendicular to the normal scan direction. This can use techniques such as an additional galvanometer mirror 520, as shown in FIG. 5B, or an adjustable tilting thick optical window 510, as shown in FIG. 5A, that is placed in the optical path between the confocal head and a microscope and that tilts about an axis 511 perpendicular to the normal scan direction. Such tilted window can be driven by devices such as a galvanometer, stepper or piezo motor.

Figure 4:
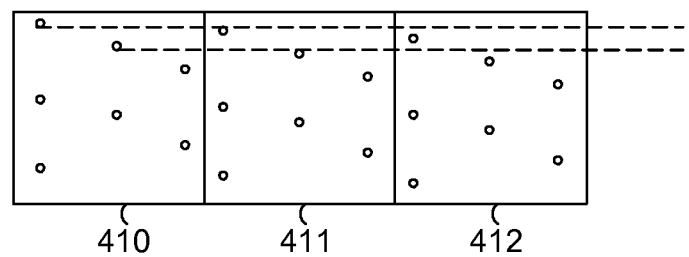
FIG. 4 illustrates exemplary phase shifted patterns in a 2-D array confocal configuration, in accordance with an embodiment hereof.
Figure 5C:
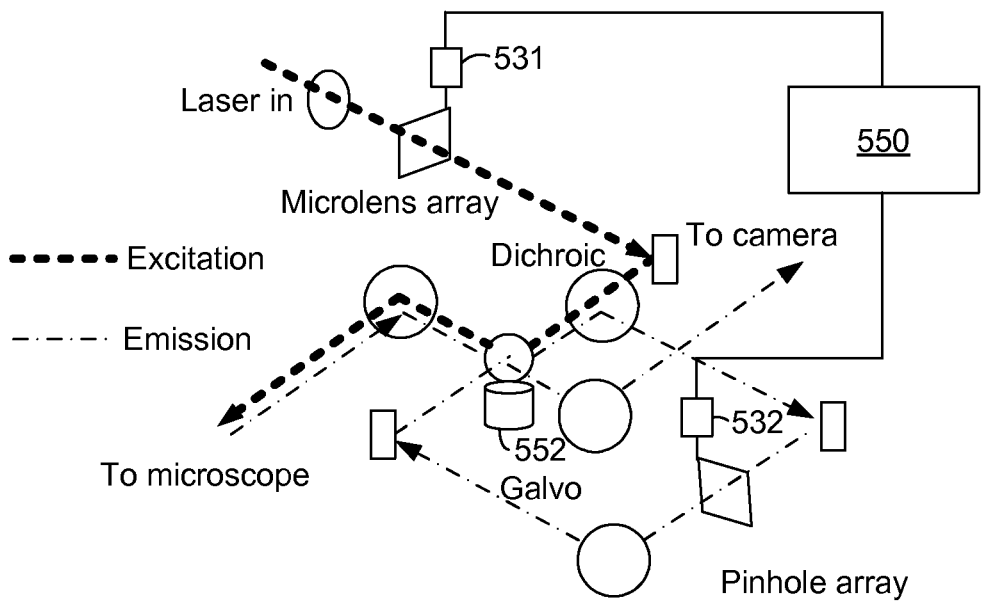
FIG. 5C illustrates an exemplary 2-D array confocal configuration, which includes precision motors, among other things, in accordance with an embodiment hereof.

An alternative method for sub native optical resolution stepping involves changing the microlens and pinhole arrays such that the pattern of microlenses and pinholes is extended, either to include additional pinholes that interleave with the existing pattern, or to include additional pattern repeats 410, 411, 412, as shown in FIG. 4, where each repeat is phase shifted so as to produce interleaved scan lines whose separation is sub native optical resolution. Thus, in a single scan sweep, the effectively adjacent scan lines through the sample plane are displaced from one another by a sub optical resolution distance. Yet another method of achieving sub native optical resolution stepping is to physically displace both the microlens and the pinhole arrays in a direction orthogonal to the normal scan direction, as shown in FIG. 5C. For example, precision motors 531 and 532, which may include piezo, stepper, linear and/or rotational motors, could be used to achieve this displacement. The precision motors 531 and 532 provide for precise movements of both arrays in order to avoid relative displacements between the arrays, which could adversely affect the confocal and resolution performance of the system. An electronic or computer control system 550 drives the precision motors 531 and 532 in synchronism with the galvo 552.

As discussed above, the various configurations of multi-beam confocal scanners may be adapted to synchronize the image capture to a stationary pattern of illumination spots in a sample. In the case of spinning disc configurations, it is not trivial to drive the disc to a specific rotation angle and to step it to an adjacent angle quickly and accurately, due to the inertial mass of the disc and its drive motor, as well as other components. Accordingly, it may be desirable to implement a means for apparently stopping the disc motion. Such means may take the form of a stroboscopic control of the light source, where the illumination source, typically but not exclusively a laser, is turned on and off extremely rapidly. A laser light source may be modulated by direct modulation of a laser diode, by passing the laser beam through an electro-optic or acousto-optic device, such as an AOM or AOTF, or a high speed shutter. An alternative method is to illuminate the sample continuously and to gate the detector, such that the detector exposure time is very short and effectively "stops" the disc motion. In some aspects, the detector may be gated on and off in synchronism with scan positions, thus enabling a snapshot image to be collected at each scan position. The cue for each image capture may be derived from the rotational position of the discs provided by an encoder device attached directly to the shaft of the discs or to the drive motor, or via an encoder track (magnetic or optical) formed on at least one of the discs and a suitable detection device that reads the encoded track. These features for strobing the illumination source and/or gating the detector may be controlled by an electronic and/or computer control system.

The 1-D array scanner can be driven step by step on each axis, using any of the scan moving mechanisms detailed in the embodiments previously described, thus the image capture can be readily synchronized with these movements. It is also possible to continuously scan with the 1-D array scanner and use stroboscopic illumination or detector gating as described for the spinning disc embodiments. Such features may be controlled by an electronic and/or computer control system.

The 2-D array scanner can also be driven step by step on each axis, using any of the scan moving mechanisms detailed in the embodiments previously described, thus the image capture can be readily synchronized with these movements. It is also possible to continuously scan with the 2-D array scanner and use stroboscopic illumination or detector gating as described for the spinning disc embodiments. Such features may be controlled by an electronic and/or computer control system.

As mentioned, the multi-beam confocal scanning system may include and/or be associated with an electronic and/or computer control system that coordinates the movement of the scan, control of the illumination, the capture of the images, and certain data processing steps, such as the data processing steps below.

Data Processing to Provide Enhanced Spatial Resolution in Multi-Beam Confocal Scanning Systems The data processing steps are described with reference to FIG. 6, which depicts an exemplary embodiment associated with a two-dimensional array scanner. Data from a one-dimensional array scanner is processed in a manner similar to the process used for the two-dimensional array scanner, which will be discussed below, but in the one-dimensional array scanner, the positions of beams in the spatial filter have a single fixed value for one axis, say x. The spinning disc scanner can also be processed in a similar manner, the difference being a conversion of the polar coordinates of the scanning and spatial filter positions into rectangular coordinates prior to testing for inclusion in the data to be passed to the algorithm discussed in in Müller et al. This testing is discussed below.

Figure 6:
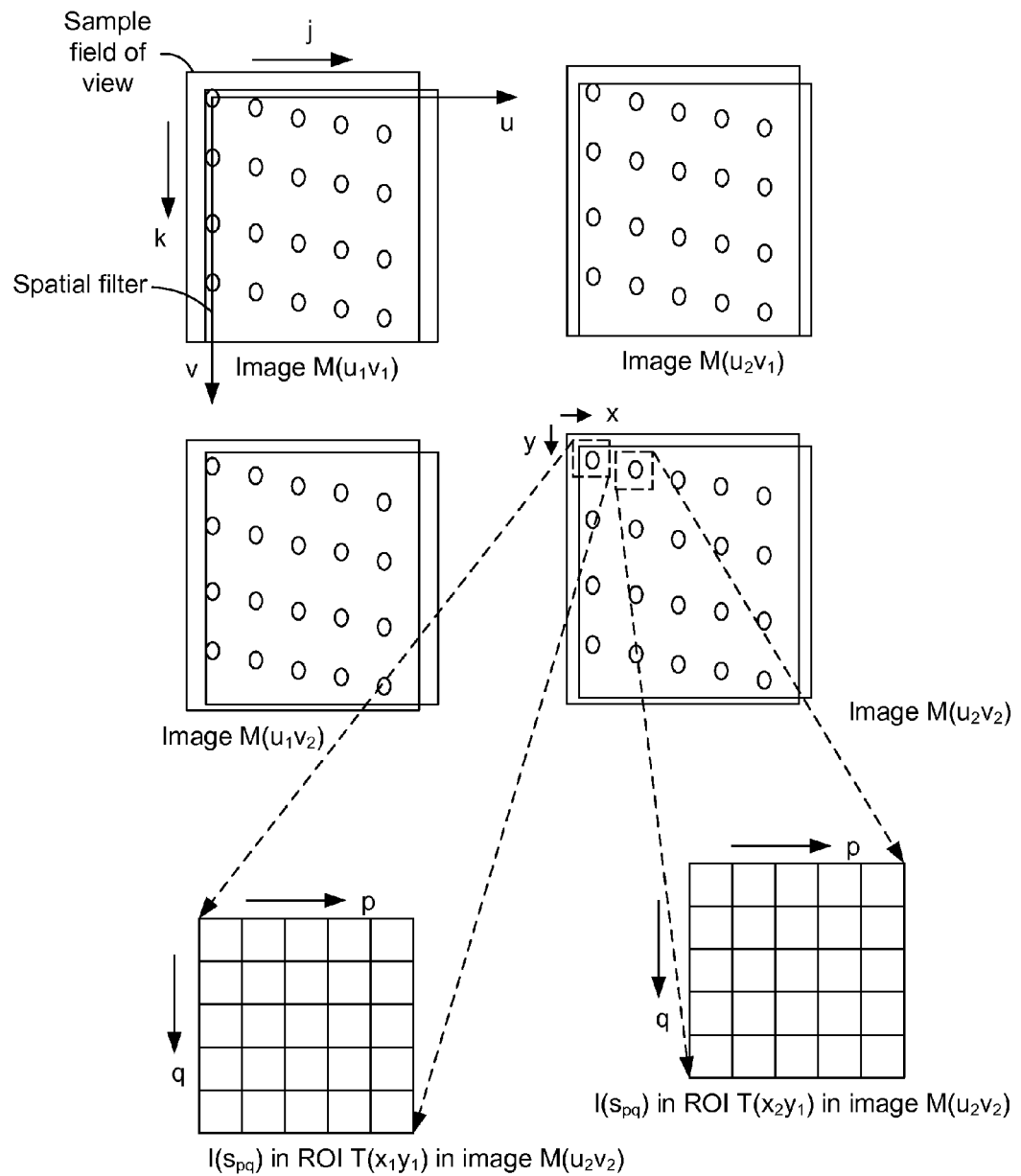
FIG. 6 illustrates an exemplary sample in a field of view and an exemplary spatial filter, in accordance with an embodiment hereof.

FIG. 6 depicts a sample and a multi-beam spatial filter, where the spatial filter is depicted as overlapping the sample. The sample in the field of view has coordinates (j, k), corresponding to the coordinates (j, k) discussed in Müller et al.

The spatial filter scan positions are described by the coordinates (u, v). For example, an image captured at a first scan position may be described as $M(u_1 v_1)$, and an image captured at a second scan position may be described as $M(u_2 v_1)$.

The positions of the microlens or pinhole elements in the multi-beam spatial filter are described by the coordinates (x, y).

For each scan position (u, v), an image is captured, such as $M(u_2 v_2)$ shown in FIG. 6. Each such image includes an array of ROIs, which are recorded by a two-dimensional detector, such as a CCD camera. Each ROI is centered on a beam corresponding to the position of a microlens or pinhole element having coordinates (x, y). Accordingly, each ROI may be described as T(xy), where T(xy) is centered on the coordinates (x, y). For example, $T(x_1 y_1)$ shown in FIG. 6 corresponds to the ROI associated with the microlens or pinhole element having coordinates $(x_1, y_1)$ at scan position $(u_2, v_2)$. Similarly, $T(x_2 y_1)$ corresponds to the ROI associated with the microlens or pinhole element having coordinates $(x_2, y_1)$ at scan position $(u_2, v_2)$. Thus, an overall location of a particular ROI may be expressed as a sum of the coordinates for the scan position (u, v) at which the ROI is recorded and the coordinates for the ROI (x, y). For example, the overall location of ROI $T(x_1 y_1)$ may be expressed as $(u_2+x_1, v_2+y_1)$, and the overall location of ROI $T(x_2 y_1)$ may be expressed as $(u_2+x_2, v_2+y_1)$.

Each ROI may have dimensions (p, q), where these coordinates correspond to a pixel position in a two-dimensional detector, such as a CCD camera. Specifically, the two-dimensional detector includes a series of pixels. Each pixel detects the amount of light that falls on the pixel within the acquisition time of the camera, and then outputs a signal that correlates to this amount of light. This signal is received by an electronic and/or computer control system (e.g., a frame grabber card within the system) and converted into an 8-, 12-, or 16-bit grey-level intensity value, which relates to the amount of light signal that was detected by the pixel. The position of a particular pixel in the two-dimensional detector may be referred to as $s_{pq}$. The pixel positioned at $s_{pq}$ detects pixel intensity data associated with the location (p, q) in the ROI. The pixel intensity data associated the location (p, q) and detected by the pixel positioned at $s_{pq}$ may be expressed as $I(s_{pq})$.

Because the two-dimensional detector detects the pixel intensity data for each location (p, q) within an ROI in this way, it may be said that the two-dimensional detector divides the ROI into an array of pixel intensities to get intensity values, such as grey-level intensity values, associated with each location (p, q) within the ROI. In this way, pixel intensity data $I(s_{pq})$ may be obtained for each location (p, q) within an ROI having a location defined in terms of the coordinates (u+x, v+y).

In an embodiment, prior to performing the calculations that will be described below, testing is performed to determine what data is to be included for purposes of the calculations. Specifically, the values of u+x and v+y may be tested to determine whether these values are within the image field of view dimensions, j and k, respectively. Such testing may be performed by an electronic and/or computer control system.

For each of the multi-beam scanner types, the ROIs centered on each beam position (x, y) at a particular scan position (u, v) may be captured simultaneously. After testing that the values of u+x and v+y lie within the image field of view dimensions j and k, respectively, the pixel intensity data from the ROIs within the field of view dimensions may be loaded into, or stored in association with, the appropriate elements of the four-dimensional array $I(r(u+x, v+y), s_{pq})$, according to the scan position (u, v) and ROI center position (x, y), as well as the pixel intensity data collected for each location, (p, q) within the ROI.

For example, when the two-dimensional detector captures an image at a scan position (u, v), pixel intensity data is obtained for each location (p, q) within each ROI centered at (x, y). Through computation, the pixel intensity data collected for the complete field of view may be subdivided according to ROIs having locations (u+x, v+y), and the pixel intensity data may then be further subdivided into intensity values associated with each pixel position $s_{pq}$, which corresponds to the location (p, q) within the ROI. This pixel intensity data may then be loaded, or stored, at the appropriate elements of the array $I(r(u+x, v+y), s_{pq})$.

Such computational processing, including the testing and the loading, may be carried out in parallel at the electronic and/or computer control system, thus improving the speed of creation of the array $I(r(u+x, v+y), s_{pq})$, which may be treated as an equivalent to the array $I(r_{jk}, s_{pq})$ of Müller et al. For example, the testing and loading of the intensity data from multiple ROIs at each scan position into the appropriate elements of the array may be processed in parallel with the collection of additional data at the remaining scan positions. Additionally or alternatively, the testing and loading of the intensity data into the appropriate elements of the array may be processed either partially or wholly post image capture.

The array $I(r(u+x, v+y), s_{pq})$ may be processed in the manner described by Müller et al. with respect to the array $I(r_{jk}, s_{pq})$. For example, the pixel intensity data included in the array $I(r(u+x, v+y), s_{pq})$ may be processed to provide an intermediate image having an improved resolution. In an embodiment, this intermediate image is Fourier transformed, filtered with a weighting function based on an improved PSF, and then reverse Fourier transformed to create a final image containing further resolution enhancement. Accordingly, such processing may be performed to produce an image with enhanced spatial resolution. These processing steps may be performed by an electronic and/or computer control system. These processing steps may be performed subsequent to the collection of all pixel intensity data for all scan positions in the field of view.

In the case of spinning disc scanners, the ROIs are centered on beams corresponding to the positions of a microlens or pinhole elements in the spatial filter, where the microlens or pinhole element positions are described in terms of polar coordinates (r, phi) (corresponding to rectangular coordinates (x, y)). The spatial filter scan positions are described in terms of polar coordinates (d, theta) (corresponding to rectangular coordinates (u, v)). These polar coordinates are converted to rectangular coordinates before testing if they lie within the image field of view dimensions (j, k), and then the image data may be processed as described above.

Figure 7:
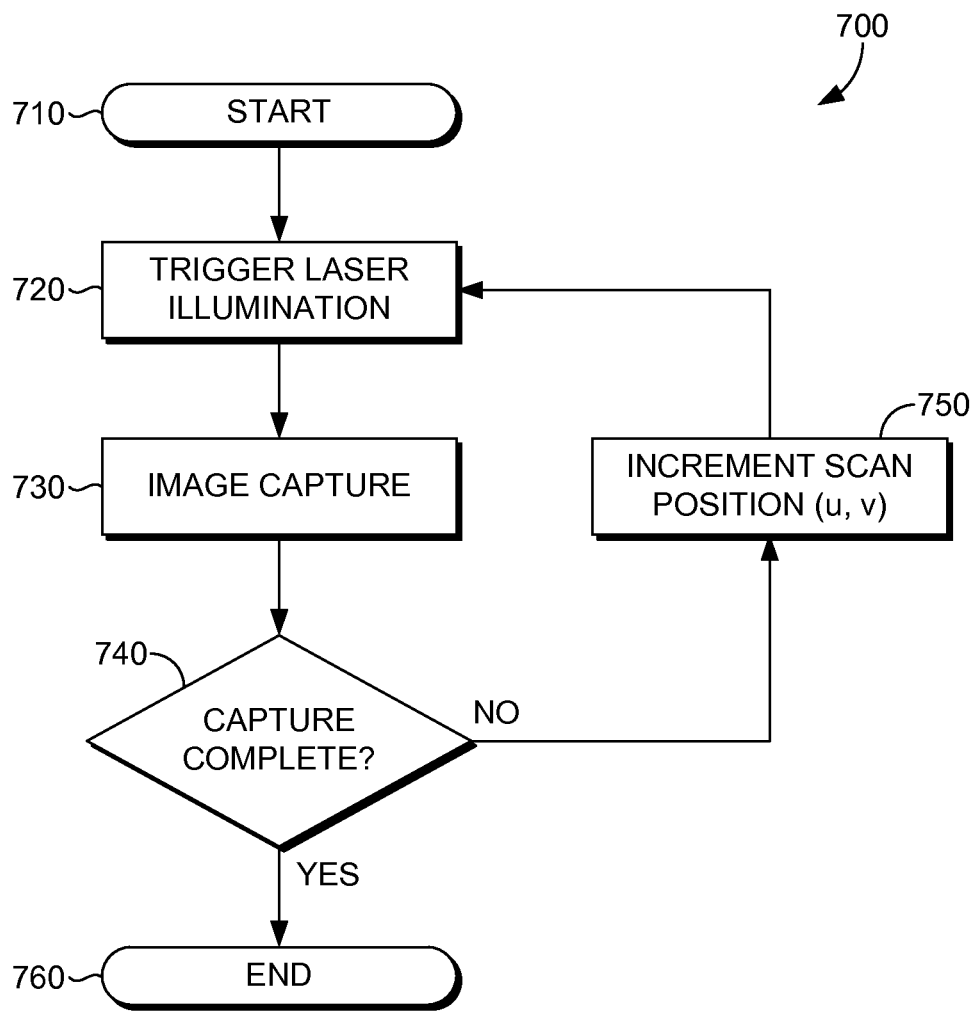
FIG. 7 illustrates a flow diagram for an exemplary sequence of data capture events, in accordance with an embodiment hereof.

Turning to FIG. 7, an exemplary method for using a multi-beam confocal scanning system to collect images for analysis is provided. At step 710, the method for collecting images of a sample is started. At step 720, a laser is positioned at a first scan position, $(u_1, v_1)$, with respect to a sample that is to be scanned, and a laser illumination is triggered. In an embodiment, the laser illumination passes through a spatial filter included in the multi-beam confocal scanning system in order to provide an array of beams for scanning the sample. Based on the triggering of the laser illumination, at step 730, an image is captured at the first scan position. A secondary image corresponding to an ROI having a location that is centered on a beam of the array of beams may be captured, or recorded, by a two-dimensional detector, such as a CCD camera included in the multi-beam confocal scanning system. Accordingly, a plurality of secondary images, each associated with a beam of the array of beams, may be captured at the first scan position by the two-dimensional detector.

At step 740, a control system (e.g., the electronic and/or computer control systems 1000, 1001, and 1002, discussed above) determines if the image capturing is complete. If the image capture is not complete, at step 750, the laser is moved with respect to the sample by an increment that is smaller than the optical resolution limit of the optical system. For example, as previously discussed with respect to FIG. 6, the laser is moved from a first scan position $(u_1, v_1)$ to a second scan position $(u_1, v_2)$, where the distance between $(u_1, v_1)$ and $(u_1, v_2)$ is smaller than the optical resolution limit for the system. As at the first scan position, a plurality of secondary images, each of which is associated with a beam of the array of beams, may be captured at the second scan position.

This step-by-step scanning, from one scan position to the next, may be accomplished in a variety of ways, including any of the means previously discussed. For example, a mirror may be placed in the light path, and a drive mechanism associated with a mirror may be precisely controlled by an electronic and/or computer control system. A tilted optical window may be positioned in the light path in order to shift the beams of light, where the tilt of the optical window is driven by a drive mechanism, which is controlled by an electronic and/or computer control system. In an additional embodiment, the step-by-step scanning is provided by moving the spatial filters along their respective axes, where such movement is driven by displacement mechanisms, including precision motors, which are controlled by an electronic and/or computer control system. In a further embodiment, subpatterns in the spatial filter provide sub optical resolution increments, as discussed above. Any number of other methods, including those discussed herein, may be implemented to achieve this step-by-step scanning. As mentioned, an electronic and/or computer control system, such as the electronic and/or computer control system 1000 and 1001 of FIGS. 1A and 1B, respectively, and the electronic and/or computer control system 1002 of FIG. 3B, may be used to synchronize and control components of the scanning system in order to achieve this step-by-step scanning.

After step 750, steps 720 through 740 are then repeated. If the image capture is determined to be complete at step 740, then at step 760, a portion of the method for collecting images for analysis is ended. Such determination may be made by an electronic and/or computer control system. Upon completing data collection, the pixel intensity data associated with each ROI (e.g., (u+x, v+y)) may be processed in accordance with the methods discussed above in order to provide an image having improved resolution. For example, the pixel intensity data included in the array $I(r(u+x, v+y), s_{pq})$ may be processed to provide an intermediate image having an improved resolution. In an embodiment, this intermediate image is Fourier transformed, filtered with a weighting function based on an improved PSF, and then reverse Fourier transformed to create a final image containing further resolution enhancement.

In addition to the method discussed with respect to FIG. 7, where a laser is displaced with respect to the sample by a sub native optical resolution increment to provide step-by-step scanning, an embodiment hereof enables continuous scanning of a sample, while creating the appearance of step-by-step incremental scanning. As described above, this may be accomplished by strobing the illumination and/or gating the detector at each required scan position. In this way, the array of beams provided by the illuminations source and a spatial filter are made to appear stationary at multiple positions on the sample, even though the scan position is continuously changing. For example, by strobing the illumination and/or gating the detector, the array of beams may be made to appear stationary at a first scan position, $(u_1, v_1)$. An image is captured at the first scan position, and as described with respect to FIG. 7, for example, the captured image includes a plurality of secondary images, or ROIs, that are recorded by a two-dimensional detector. As previously explained, each ROI is associated with a beam of the array of beams. An electronic and/or computer control system may be programmed to synchronize the events that cause the array of beams to appear stationary (e.g., strobing the illumination and/or gating the detector) with the image capture by the two-dimensional detector. For example, the electronic and/or computer control system may cause the illumination to be pulsed on and off in synchronism with the desired scan positions, thus effectively stopping the scan motion and enabling images to be collected at each desired scan position. Similarly, the electronic and/or computer control system may cause the detector to be gated on and off in synchronism with the desired scan positions, thus enabling images to be collected at each desired scan position.

Following the image capture at the first scan position, the strobing of the illumination and/or the gating of the detector may create the appearance that the array of beams are stationary at a second scan position, $(u_1, v_2)$, where the distance between $(u_1, v_1)$ and $(u_1, v_2)$ is smaller than the optical resolution limit for the system. Again, as described above with respect to FIG. 7, an image is captured at the second scan position, where the captured image includes a plurality of secondary images, or ROIs, that are recorded by a two-dimensional detector. This is repeated until image capture is determined to be complete. Such determination may be made by an electronic and/or computer control system. Upon completing data collection, the pixel intensity data for each location (e.g., (u+x, v+y) may be processed in accordance with the methods discussed above in order to provide an image having improved resolution.

Figure 8:
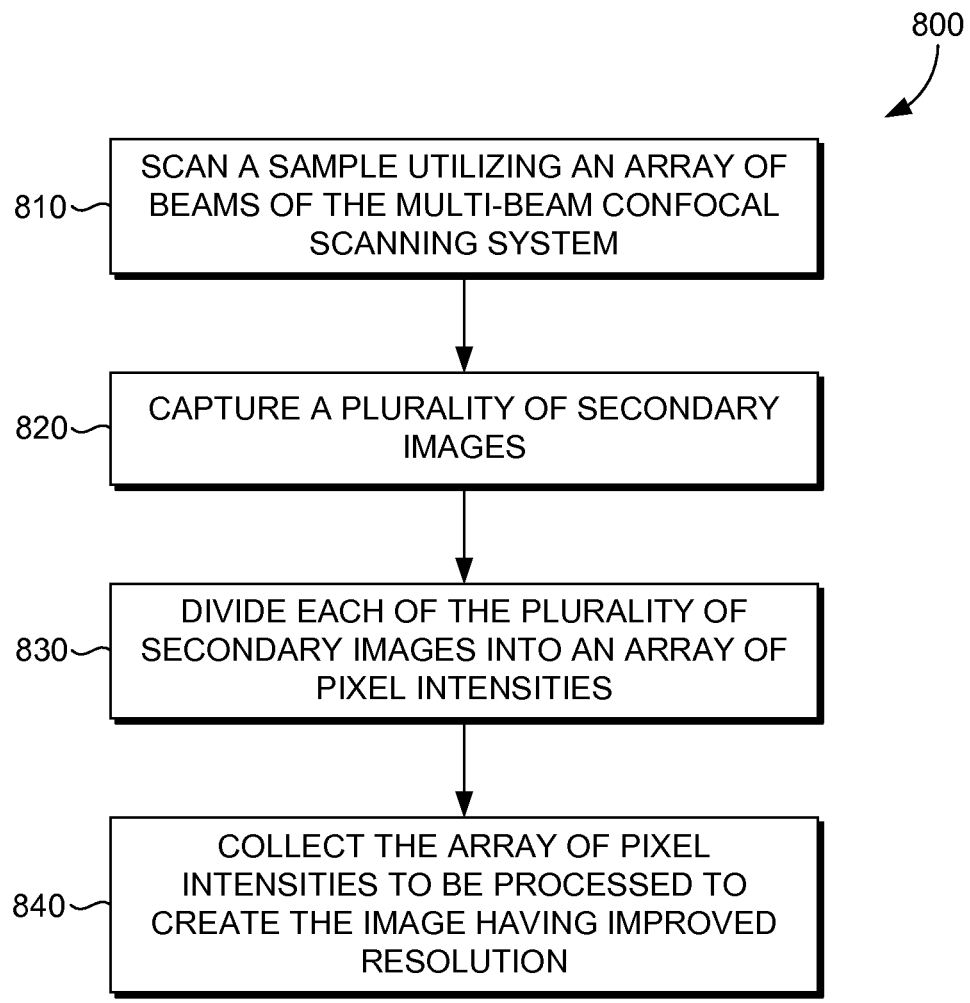
FIGS. 8-10 illustrate flow diagrams of exemplary methods for generating an image having an improved resolution, in accordance with an embodiment hereof.
Figure 9:
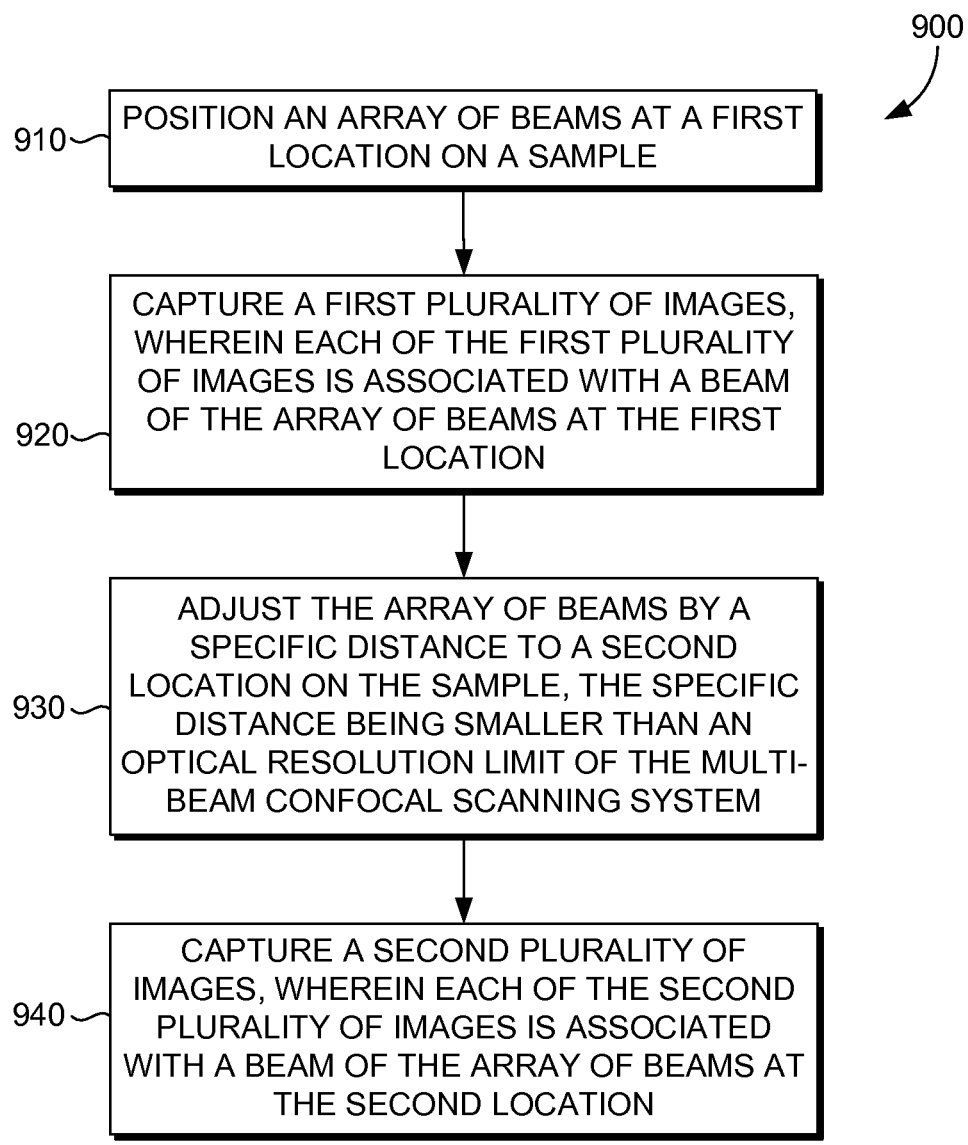
Figure 10:
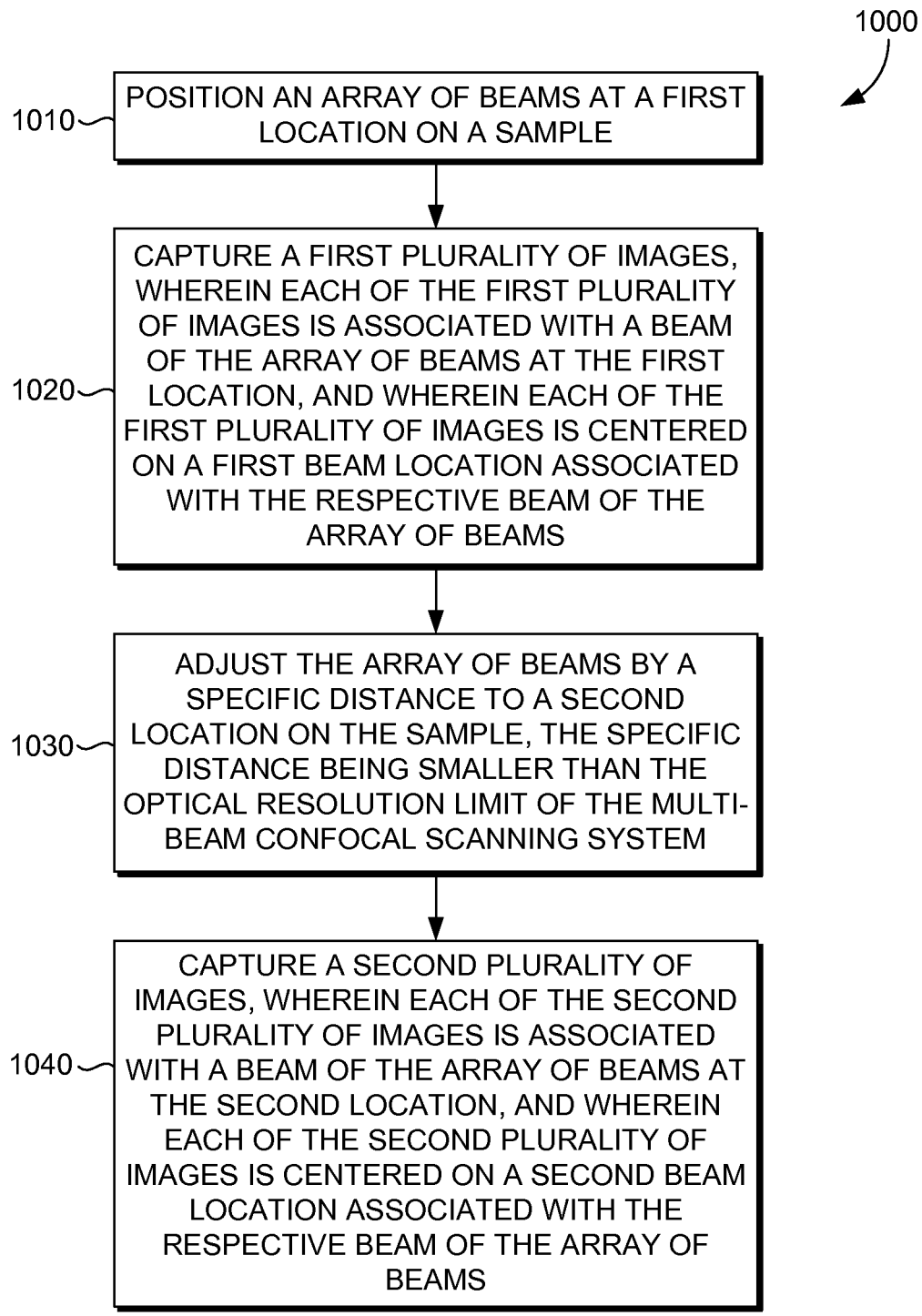

The flow diagrams included in FIGS. 8-10 depict exemplary steps for generating images having improved resolution. For example, FIG. 8 provides an exemplary method for utilizing a multi-beam confocal scanning system to generate an image of a sample, where the image has an improved resolution. The multi-beam confocal scanning system may comprise any of the following: a swept field confocal scanner, a 1-D confocal scanner, a Nipkow disc confocal scanner, or a 2-D confocal scanner.

At step 810, the sample is scanned utilizing an array of beams provided by an illumination source of the multi-beam confocal scanning system. The array of beams may be created by a spatial filter of the multi-beam confocal scanning system. The scanning of the sample may comprise the array of beams appearing stationary at multiple locations on the sample. As previously described, the array of beams may be made to appear stationary at a particular scan position by strobing the illumination source (e.g., turning the illumination source on and off, rapidly) and/or gating the detector (e.g., causing the detector to be gated on and off, rapidly), accordingly. Thus, even though the multi-beam confocal scanning system may be continuously scanning the sample, the array of beams may appear stationary at a first scan location, at a second scan location, and at any other number of scan locations.

At step 820, a plurality of secondary images is captured at each location of the multiple locations on the sample. For example, at each scan location, when the array of beams is made to appear stationary, an image may be captured. The image may include a plurality of secondary images (such as the ROIs, discussed above), where each ROI is associated with one of the beams of the array of beams. The secondary images may be captured, or recorded, by a two-dimensional detector, such as a CCD camera, included in the multi-beam confocal scanning system. An electronic and/or computer controller, as described above, may be used to control the synchronization of the beams appearing stationary with the capture of the plurality of secondary images.

At step 830, each of the plurality of secondary images is divided into an array of pixel intensities. For example, as previously explained, when the two-dimensional detector records an image, it divides an ROI into an array of pixel intensity data for the locations (p, q) within the ROI.

At step 840, the array of pixel intensities is collected. For example, as discussed above, when light falls on each pixel included in the two-dimensional detector, each pixel outputs a signal correlating to the amount of light that fell on the pixel. A frame grabber card within the electronic and/or computer control system may receive this signal and convert it into an 8-, 12-, or 16-bit number representative of the amount of light. The pixel intensity data for the complete field of view may be subdivided into sets of data corresponding to a scan position (u, v) and an ROI center location (x, y). The pixel intensity data may then be further subdivided into values associated with a pixel position $s_{pq}$, which corresponds to the location (p, q) within the ROI. This pixel intensity data may then be collected for processing. For example, the pixel intensity data may be loaded into the appropriate elements of the four-dimensional array $I(r(u+x, v+y), s_{pq})$, according to the scan position (u, v) and ROI center position (x, y), as well as the pixel intensity data collected at each location (u+x, v+y). The array of pixel intensities is collected in this manner in order to be processed to create the image having improved resolution. For example, the array $I(r(u+x, v+y), s_{pq})$ may be processed to provide an intermediate image having an improved resolution. In an embodiment, this intermediate image is Fourier transformed. The image may further be filtered with a weighting function based on an improved PSF. A reverse Fourier transformation may then be applied to the filtered image in order to create a final image containing further resolution enhancement. Accordingly, such processing may be performed to produce an image with enhanced spatial resolution.

FIG. 9 illustrates another exemplary method for utilizing a multi-beam confocal scanning system to generate an image of a sample, where the image has improved resolution. At step 910, an array of beams is positioned at a first location on a sample. For example, as discussed above with respect to FIG. 7, an array of beams may be positioned at $(u_1, v_1)$. Such positioning may be controlled by an electronic and/or computer control system included in the multi-beam confocal scanning system.

At step 920, a first plurality of images is captured by a two-dimensional detector, such as a CCD camera. Each of the first plurality of images is associated with a beam of the array of beams at the first location. This plurality of images may be similar to the ROIs discussed above. For example, each of the first plurality of images may be centered on a location associated with a beam of the array of beams (e.g., expressed in coordinates (x, y), as discussed above) at the first scan position, $(u_1, v_1)$.

At step 930, the array of beams is adjusted by a specific distance to a second location, $(u_1, v_2)$ on the sample. The specific distance is smaller than an optical resolution limit of the multi-beam confocal scanning system. This step-by-step scanning, from one scan position to the next, may be accomplished in a variety of ways, including any of the means previously discussed, such as using windows and/or mirrors to displace a beam, using precision motors to physically displace microlens and pinhole arrays, or any number of other methods. For example, one or more drive mechanisms may each carry a scanning mirror, and/or one or more drive mechanisms may adjust a tilt angle of a tilted optical window included in the multi-beam confocal scanning system, where the tilted optical window is located in illuminating and returning light beams. Additionally or alternatively, for example, illumination and detection spatial filters may be moved along their respective axes.

At step 940, a second plurality of images is captured, by the two-dimensional detector, at the second location $(u_1, v_2)$. Again, this plurality of images may be similar to the ROIs discussed above. For example, each of the second plurality of images may be associated with a beam of the array of beams (e.g., expressed in coordinates (x, y), as discussed above) at the second location, $(u_1, v_2)$.

In some instances, the first plurality of images and the second plurality of images may be divided into an array of pixel intensities. The array of pixel intensities may then be collected for processing, as described above, to create an image having improved resolution.

FIG. 10 illustrates an exemplary method for generating an image having an improved resolution utilizing a multi-beam confocal scanning system. The system comprises one or more rotating discs containing a spatial filter and an array of confocal apertures. At step 1010, an array of beams is positioned at a first location on a sample. For example, as discussed above, an array of beams may be positioned at $(d_1, theta_1)$.

At step 1020, a first plurality of images is captured by a two-dimensional detector. This plurality of images may be similar to the ROIs discussed above. For example, each of the first plurality of images may be associated with a beam of the array of beams at the first location. Specifically, each of the first plurality of images may be centered on a first beam location associated with the respective beam of the array of beams. This first beam location may be expressed in terms of the coordinates (r, phi), as discussed above.

At step 1030, the array of beams is adjusted by a specific distance to a second location, $(d_1, theta_2)$, on the sample. The specific distance is smaller than an optical resolution limit of the multi-beam confocal scanning system. This step-by-step scanning, from one scan position to the next, may be accomplished in a variety of ways, including any of the means previously discussed, such as using drive mechanisms controlling windows and/or mirrors to displace a beam, using precision motors to physically displace microlens and pinhole arrays, or any number of other methods. For example, a high resolution encoder mounted on a shaft of the one or more rotating discs may be used to determine a rotation angle of the one or more discs, and the rotation angle of the one or more discs may be controlled by an electronic and/or computer control system, as discussed above.

At step 1040, a second plurality of images is captured at the second location. Each of the second plurality of images may be associated with a beam of the array of beams at the second location. Each of the second plurality of beams may be centered on a second beam location associated with the respective beam of the array of beams. This second beam location may be expressed in terms of the coordinates (r, phi), as discussed above. As mentioned, the polar coordinates may be converted to rectangular coordinates prior to processing.

Exemplary Operating Environment

Figure 11:
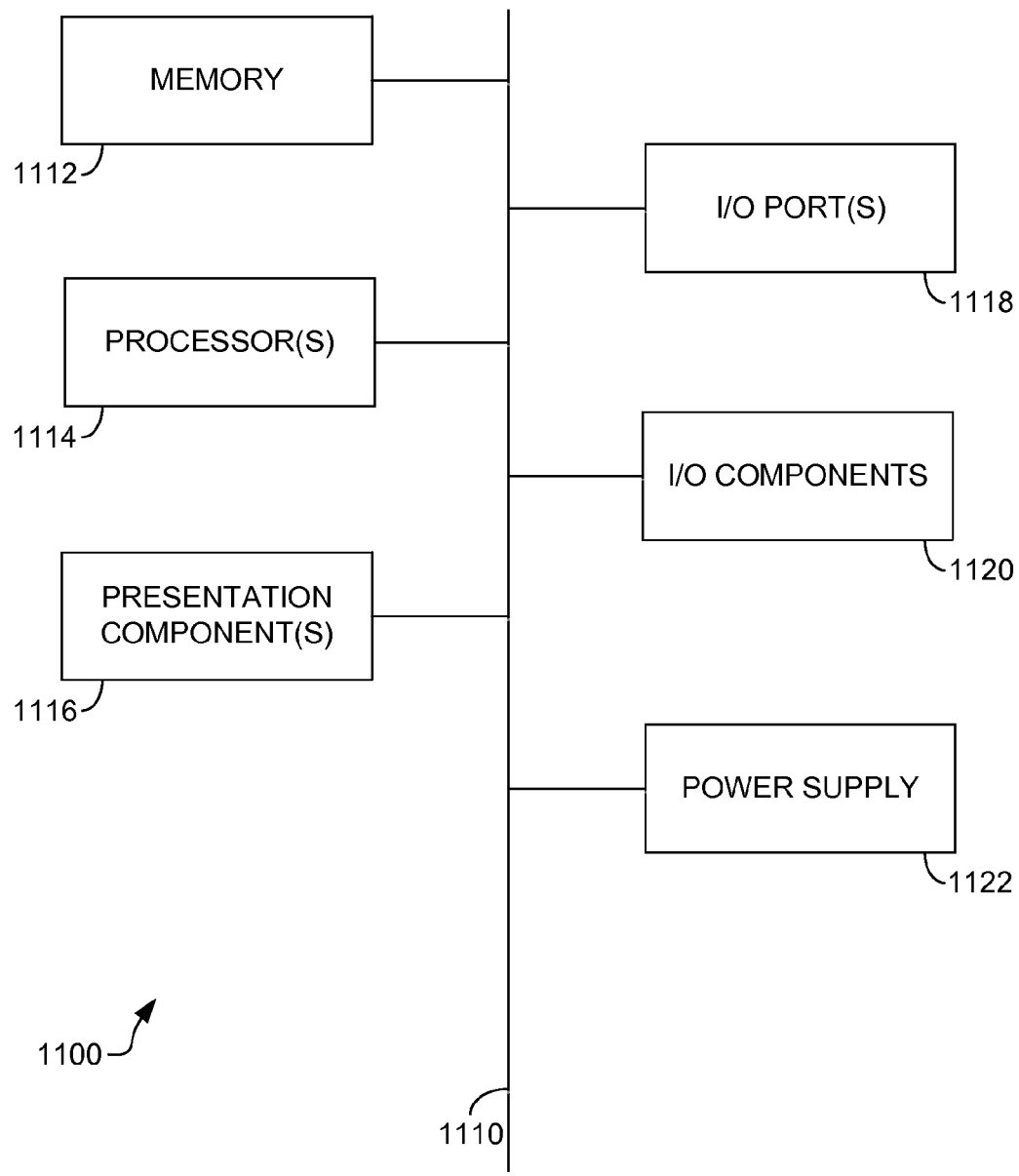
FIG. 11 illustrates a block diagram of an exemplary computing environment suitable for use in implementing embodiments hereof.

An exemplary operating environment in which embodiments hereof may be implemented is described with respect to FIG. 11 and is designated generally as computing device 1100. The electronic and/or computer control system discussed at various points above (including the electronic and/or computer control systems 1000, 1001, and 1002) may include certain features discussed here with respect to computing device 1100 in order to provide the various functions discussed above. The computing device 1100 is but one example of a suitable computing environment and is not intended to suggest any limitation as to the scope of use or functionality of embodiments of the invention. Neither should the computing device 1100 be interpreted as having any dependency or requirement relating to any one or combination of components illustrated.

Embodiments hereof may be described in the general context of computer code or machine-usable instructions, including computer-usable or computer-executable instructions such as program modules, being executed by a computer or other machine, such as a personal data assistant, a smart phone, a tablet PC, or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With continued reference to FIG. 11, the computing device 1100 includes a bus 1110 that directly or indirectly couples the following devices: a memory 1112, one or more processors 1114, one or more presentation components 1116, one or more input/output (I/O) ports 1118, one or more I/O components 1120, and an illustrative power supply 1122. The bus 1110 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component, such as a display device, to be an I/O component. Also, processors have memory. The inventors hereof recognize that such is the nature of the art, and reiterate that the diagram of FIG. 11 is merely illustrative of an exemplary computing device that can be used in connection with one or more embodiments hereof. Distinction is not made between such categories as "workstation," "server," "laptop," "hand-held device," etc., as all are contemplated within the scope of FIG. 11 and reference to "computing device."

The computing device 1100 typically includes a variety of computer-readable media. Computer-readable media may be any available media that is accessible by the computing device 1100 and includes both volatile and nonvolatile media, and removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1112 includes computer-storage media in the form of any combination of volatile and nonvolatile memory. The memory may be removable, non-removable, or a combination thereof. Exemplary hardware devices include solid-state memory, hard drives, optical-disc drives, and the like. The computing device 1100 includes one or more processors that read data from various entities such as the memory 1112 or the I/O components 1120. The presentation component(s) 1116 present data indications to a user or other device. Exemplary presentation components include a display device, speaker, printing component, vibrating component, and the like.

The I/O ports 1118 allow the computing device 1100 to be logically coupled to other devices including the I/O components 1120, some of which may be built in. Illustrative components include a microphone, joystick, game pad, satellite dish, scanner, printer, wireless device, and the like. Interaction with the I/O components 1120 may be via voice, touch, gestures, keyboard, a pointing device such as a mouse, and the like.

What is claimed is:

1. A method for utilizing a multi-beam confocal scanning system to generate an image of a sample, the image having an improved resolution, the method comprising:
    scanning the sample utilizing an array of beams of the multi-beam confocal scanning system, the scanning comprising the array of beams appearing stationary at multiple locations on the sample;
    capturing a plurality of secondary images at each location of the multiple locations on the sample;
    dividing each of the plurality of secondary images into an array of pixel intensities; and
    collecting the array of pixel intensities to be processed to create the image having the improved resolution.

2. The method of claim 1, further comprising applying a Fourier transformation to the image.

3. The method of claim 2, further comprising filtering the image with a weighting function based on an improved point spread function.

4. The method of claim 3, further comprising applying a reverse Fourier transformation to the filtered image.

5. The method of claim 1, wherein the array of beams is created by a spatial filter of the multi-beam confocal scanning system.

6. The method of claim 1, wherein the capturing the plurality of secondary images at each location of the multiple locations of the array of beams comprises utilizing a two-dimensional detector of the multi-beam confocal scanning system.

7. The method of claim 1, wherein the scanning comprises an illumination source being turned on and turned off rapidly.

8. The method of claim 1, wherein the scanning comprises a two-dimensional detector being gated on and off rapidly.

9. The method of claim 1, wherein the multi-beam confocal scanning system comprises one of the following: a swept field confocal scanner, a 1-D confocal scanner, a Nipkow disc confocal scanner, or a 2-D confocal scanner.

10. A method for utilizing a multi-beam confocal scanning system to generate an image of a sample, the image having an improved resolution, the method comprising:
    positioning an array of beams at a first location on the sample;
    capturing a first plurality of images, wherein each of the first plurality of images is associated with a beam of the array of beams at the first location;
    adjusting the array of beams by a specific distance to a second location on the sample, the specific distance being smaller than an optical resolution limit of the multi-beam confocal scanning system; and
    capturing a second plurality of images, wherein each of the second plurality of images is associated with a beam of the array of beams at the second location.

11. The method of claim 10, further comprising dividing each of the first plurality of images and each of the second plurality of images into an array of pixel intensities.

12. The method of claim 11, further comprising collecting the array of pixel intensities for processing to create the image having the improved resolution.

13. The method of claim 10, wherein each of the first plurality of images is centered on a first beam location associated with the respective beam of the array of beams, and wherein each of the second plurality of images is centered on a second beam location associated with the respective beam of the array of beams.

14. The method of claim 10, wherein the adjusting the array of beams by the specific distance to the second location comprises utilizing one or more drive mechanisms each carrying a scanning mirror.

15. The method of claim 10, wherein the adjusting the array of beams by the specific distance to the second location comprises moving illumination and detection spatial filters along their matching axes.

16. The method of claim 10, wherein the adjusting the array of beams by the specific distance to the second location comprises utilizing one or more drive mechanisms to adjust a tilt angle of a tilted optical window of the multi-beam confocal scanning system, the tilted optical window being located in illuminating and returning light beams.

17. A method for generating an image having an improved resolution utilizing a multi-beam confocal scanning system, the system comprising one or more rotating discs that contain a spatial filer and an array of confocal apertures, the method comprising:

positioning an array of beams at a first location on a sample;

capturing a first plurality of images, wherein each of the first plurality of images is associated with a beam of the array of beams at the first location, and wherein each of the first plurality of images is centered on a first beam location associated with the respective beam of the array of beams;

adjusting the array of beams by a specific distance to a second location on the sample, the specific distance being smaller than an optical resolution limit of the multi-beam confocal scanning system; and capturing a second plurality of images, wherein each of the second plurality of images is associated with a beam of the array of beams at the second location, and wherein each of the second plurality of images is centered on a second beam location associated with the respective beam of the array of beams.

18. The method of claim 17, wherein the adjusting the array of beams by the specific distance comprises utilizing a high resolution encoder mounted on a shaft of the one or more rotating discs.

19. The method of claim 17, wherein the adjusting the array of beams by the specific distance comprises utilizing a drive mechanism having a scanning mirror.

20. The method of claim 17, wherein the adjusting the array of beams by the specific distance comprises utilizing a one or more drive mechanisms to adjust a tilt angle of a tilted optical window of the multi-beam confocal scanning system.

* * * * *